United States Patent
Walker et al.

(10) Patent No.: US 6,249,879 B1
(45) Date of Patent: Jun. 19, 2001

(54) ROOT FILESYSTEM FAILOVER IN A SINGLE SYSTEM IMAGE ENVIRONMENT

(75) Inventors: Bruce J. Walker, Rolling Hills Estates; John L. Byrne, Pasadena, both of CA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/071,048

(22) Filed: Apr. 30, 1998

Related U.S. Application Data

(60) Provisional application No. 60/066,012, filed on Nov. 4, 1997.

(51) Int. Cl.[7] .................................................. G06F 11/00
(52) U.S. Cl. ................................... 714/11; 714/5; 714/15
(58) Field of Search ............................ 714/11, 47, 15, 714/6, 5, 16; 707/8, 204

(56) References Cited

U.S. PATENT DOCUMENTS

| | | | |
|---|---|---|---|
| 4,807,118 | * | 2/1989 | Lin et al. ............................ 709/237 |
| 4,819,159 | * | 4/1989 | Shipley et al. ..................... 364/200 |
| 4,887,204 | * | 12/1989 | Johnson et al. .................... 364/200 |
| 5,001,628 | * | 3/1991 | Johnson et al. .................... 364/200 |
| 5,151,989 | * | 9/1992 | Johnson et al. .................... 395/600 |
| 5,175,852 | * | 12/1992 | Johnson et al. .................... 395/600 |
| 5,454,108 | * | 9/1995 | Devarakonda et al. ............ 395/650 |
| 5,513,314 | * | 4/1996 | Kandasamy et al. .......... 395/182.04 |
| 5,566,297 | * | 10/1996 | Devarakonda et al. ....... 395/182.13 |
| 5,628,014 | * | 5/1997 | Cecchini et al. .................... 707/205 |
| 5,659,682 | * | 8/1997 | Devarakonda et al. ....... 395/184.01 |
| 5,812,748 | * | 9/1998 | Ohran et al. ............................ 714/4 |
| 5,826,253 | * | 10/1998 | Bredenberg ............................. 707/2 |
| 5,875,290 | * | 2/1999 | Bartfai et al. ........................ 714/13 |
| 5,924,116 | * | 7/1999 | Aggarwal et al. .................. 711/122 |
| 5,996,086 | * | 11/1999 | Delaney et al. ......................... 714/4 |
| 6,044,475 | * | 3/2000 | Chung et al. ......................... 714/15 |

OTHER PUBLICATIONS

Compaq, Compaq NonStop Clusters for SCO Unix Ware, http://www.tadem.com/prod des/ncunixpd/ncunixpd.htm, pp. 5, Sept. 1999.*

Sun Microsystems, "The NFS Distributed File Service–Preserving File Intergrity," NFS White Paper, http://www.sun.com/software/white–papers/wp–nfs/nfs 13.html; $sessionid$IE2QZTIAAYC3JAMUVFZE5YQ#34514, Mar. 1995, pp.1–2.*

* cited by examiner

Primary Examiner—Robert Beausoleil
Assistant Examiner—Bryce Bonzo
(74) Attorney, Agent, or Firm—Fenwick & West LLP

(57) ABSTRACT

A method and apparatus for transparent failover of a filesystem within a computer cluster is provided. For failover protection, a filesystem is physically connected to an active server node and a standby server node. A cluster file system provides distributed access to the filesystem throughout the computer cluster. The cluster file system monitors the progress of each operation performed on the failover protected filesystem. If the active server node should fail during an operation, all processes performing operations on the failover protected filesystem are caused to sleep. The filesystem is then relocated to the standby server node. The cluster file system then awakens each sleeping process and retries each pending operation.

6 Claims, 6 Drawing Sheets

ROOT FILESYSTEM FAILOVER IN A SINGLE SYSTEM IMAGE ENVIRONMENT

RELATED APPLICATIONS

The following application claims the benefit of U.S. Provisional Application Serial No. 60/066,012 entitled "Filesystem Failover in a Single System Image Environment" by Bruce Walker, filed Nov. 4, 1997, the disclosure of which is incorporated in this document by reference.

The following co-pending patent applications, which were filed on Apr. 30, 1998, are related to the subject application and are herein incorporated by reference:

Application Ser. No. 09/070,897, entitled "Filesystem Data Integrity in a Single System Image Environment" of Bruce J. Walker, David B. Zafman and William W. Chow.

Application Ser. No. 09/071,145, entitled "Filesystem Failover in a Single System Image Environment" of Bruce J. Walker, John L. Byrne, William W. Chow, John A. Gertwagen, Laura L. Ramirez and David B. Zafman.

FIELD OF THE INVENTION

The present invention relates generally to techniques for increasing the availability of computer filesystems. More specifically, the present invention includes a method and apparatus for transparent failover of a filesystem in an environment where the filesystem is shared by a group of computers.

BACKGROUND OF THE INVENTION

Computer clusters are an increasingly popular alternative to more traditional computer architectures. A computer cluster is a collection of individual computers (known as nodes) that are interconnected to provide a single computing system. The use of a collection of nodes has a number of advantages over more traditional computer architectures. One easily appreciated advantage is the fact that nodes within a computer cluster may fail individually. As a result, in the event of a node failure, the majority of nodes within a computer cluster may survive in an operational state. This has made the use of computer clusters especially popular in environments where continuous availability is required.

Single system image (SSI) clusters are a special type of computer cluster. SSI clusters are configured to provide programs (and programmer's) with a unified environment in which the individual nodes cooperate to present a single computer system. Resources, such as filesystems, are made transparently available to all of the nodes included in an SSI cluster. As a result, programs in SSI clusters are provided with the same execution environment regardless of their physical location within the computer cluster. SSI clusters increase the effectiveness of computer clusters by allowing programs (and programmers) to ignore many of the details of cluster operation. Compared to other types of computer clusters, SSI clusters offer superior scaleablity (the ability to incrementally increase the power of the computing system), and manageability (the ability to easily configure and control the computing system). At the same time, SSI clusters retain the high availability of more traditional computer cluster types.

As the size of a computer cluster increases, so does the chance for failure among the cluster's nodes. Failure of a node has several undesirable effects. One easily appreciated effect is the performance degradation that results when the work previously performed by a failed node is redistributed to surviving nodes. Another undesirable effect is the potential loss of a resource, such as a filesystem, that is associated with a failed node.

Node loss can be especially serious in SSI clusters. This follows because resources are transparently shared within SSI clusters. Sharing of resources means that a single resource may be used by a large number of processes spread throughout an SSI cluster. If node failure causes the resource to become unavailable, each of these processes may be negatively impacted. Thus, a single node failure may impact many processes. Resource sharing also increases the likelihood that a process will access resources located on a number of different nodes. In so doing, the process becomes vulnerable to the failure of any of these nodes.

To ensure reliability, SSI clusters employ a number of different techniques. Failover is one of these techniques. To provide failover for a resource, the resource is associated with at least two nodes. The first of these nodes provides access to the resource during normal operation of the SSI cluster. The second node functions as a backup and provides access to the resource in the event that the first node fails. Failover, when properly implemented, greatly reduces the vulnerability of an SSI cluster to node failure.

In SSI clusters, filesystems are one of the most commonly shared resources. Thus, filesystem failover is especially important to the reliable operation of SSI clusters. Unfortunately, proper implementation of filesystem failover is a difficult task. This is particularly true in cases where filesystem performance is also a key consideration. For example, to increase performance of a shared filesystem, it is often necessary to aggressively cache the filesystem at each node where the filesystem is used. In cases where the filesystem fails over, it is imperative to maintain the consistency of the filesystem. Maintaining consistency during failover becomes increasingly problematic as caching becomes more aggressive. Thus, there is a need for techniques that balance the need to achieve high-performance filesystem operation and the need to provide failover protection.

SUMMARY OF THE INVENTION

An embodiment of the present invention includes a method and apparatus for filesystem failover in an SSI cluster. A representative environment for the present invention includes an SSI computer cluster. The SSI computer cluster includes a series of individual computer systems referred to as nodes. The nodes of the SSI computer cluster operate under control of UNIX® or UNIX-like operating systems.

Within the SSI cluster, one or more filesystems may be configured for failover protection. Each failover protected filesystem is located on a dual-ported disk (or other media that is accessible by more than one node). Two nodes are associated with each failover protected filesystem. The first node associated with a failover protected filesystem is the filesystem's active server node. The second node associated with a failover protected filesystem is the filesystem's standby server node.

Failover protected filesystems are mounted on their active server nodes as physical UNIX® filesystems. Processes do not, however, directly access failover protected filesystems using the physical UNIX® filesystems. Instead, processes access the mounted filesystems using a cluster filing environment (CFE). CFE, in turn, uses the physical UNIX® filesystem as needed. CFE is a distributed filesystem and includes a cluster filesystem (CFS), a cluster mount service (CMS) and a token manager.

CFS acts as a layer that is stacked onto the underlying physical UNIX® filesystems. Each active server node includes an instance of the CFS for each mounted filesystem. CFS instances are dynamically created on each node that uses a failover protected filesystem (a client node is a node that is not the active server node for a failover protected filesystem that uses the failover protected filesystem). Each CFS instance provides an interface to its associated failover protected filesystem. Coherency between the various instances of the CFS (on the client nodes or the active server nodes) is maintained through the use of the token manager. In this way, each CFS instance associated with a failover protected filesystem provides identical data and other filesystem attributes. The existence and location of each mounted filesystem is tracked by the CMS.

Processes (on the client nodes or the active server nodes) perform operations on failover protected filesystems exclusively by use of the CFS layer. The CFS layer monitors each operation that processes perform on failover protected filesystems. If an active server node fails during an operation, the CFS layer causes the process performing the operation to sleep in an interruptable state. When the failover protected filesystem on which the process was performing the operation later becomes available (i.e., when it is failed over to its standby server node), the CFS layer awakens the sleeping process and completes the operation.

The operational status of the nodes within the SSI cluster is monitored by a deamon process. If the active server node for a non-root failover protected filesystem fails, the deamon process notifies the failover protected filesystem's standby server node. In response, the standby server node carefully checks the integrity of the UNIX® filesystem associated with the failover protected filesystem. The standby server node then mounts the UNIX® filesystem associated with the failover protected filesystem. The existing CFS instance (originally located on the active server node) is then associated with the mounted filesystem on the standby server node. At this point, the standby server node functions as the active server node for the failover protected filesystem within the SSI cluster.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
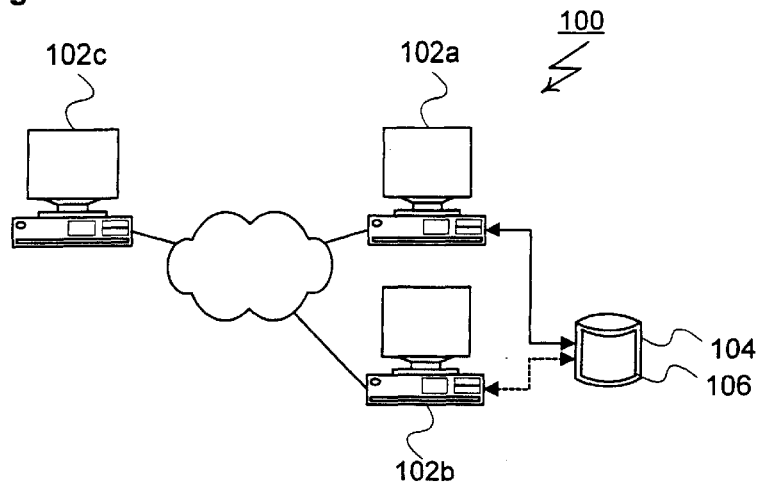
FIG. 1 is a block diagram of a computer cluster shown as an exemplary environment for an embodiment of the present invention.

In FIG. 1, an SSI computer cluster is shown as a representative environment for the present invention and generally designated 100. SSI computer cluster 100 includes a series of computer systems referred to as nodes, of which nodes 102a through 102c are representative. Nodes 102 are intended to be representative of an extremely wide range of computer system types including personal computers, workstations and mainframes. SSI computer cluster 100 may include any positive number of nodes 102. Preferably, nodes 102 are configured to provide a single system image, and operate under control of UNIX® or UNIX-like operating systems.

SSI cluster 100 includes a dual ported disk 104. Dual ported disk 104 is configured to provide read/write access to node 102a. For this reason, node 102a is referred to as the active server node 102a of dual ported disk 104. SSI cluster 100 may reconfigure dual ported disk 104 so that read/write access is shifted to node 102b. This allows node 102b to replace active server node 102a in the event of failure of active server node 102a. For this reason, node 102b is referred to as the standby server node 102b of dual ported disk 104. In general, it should be appreciated that dual ported disk 104 is intended to be representative of a wide range of mass storage devices and is specifically not intended to be limited to disk drive technologies. The dual ported nature of dual ported disk 104 may also be extended to provide any number of standby server nodes 102b. SSI cluster 100 may include any number of dual ported disks 104 without departing from the spirit of the present invention.

Dual ported disk 104 may be configured to include one or more filesystems 106. To simplify this description, it will be assumed, without loss of generality, that dual ported disk 104 is configured to include only a single filesystem 106. Filesystem 106 may be any filesystem type for which a vfs (virtual file system) interface is available. Example of suitable filesystem types include VxFS, s5fs, ufs, and FAT.

Figure 2:
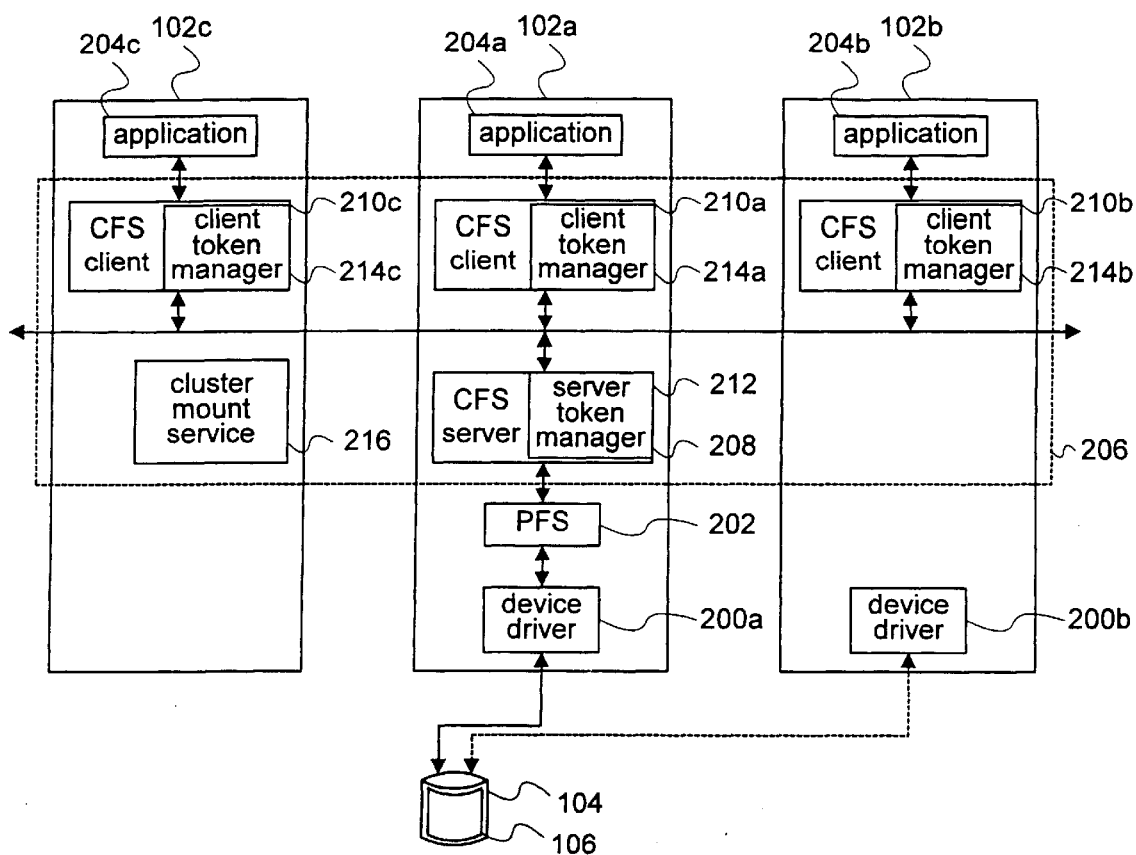
FIG. 2 is a block diagram showing the interaction between application processes and a physical filesystem using the cluster file environment (CFE) of an embodiment of the present invention.

Use of filesystem 106 within SSI cluster 100 is better appreciated by reference to FIG. 2. In FIG. 2, it may be seen that active server node 102a and standby server node 102b include device drivers 200a and 200b, respectively. Device drivers 200 perform the low level functions required for interaction with dual ported disk 104. Active server node also includes a physical filesystem (PFS) 202. PFS 202 is intended to be representative of vfs type filesystems as used in modern UNIX implementations. Thus, PFS 202 provides a set of vfs operations for manipulating filesystem 106. PFS 202 also provides a set of vnode operations for manipulating files located within filesystem 106. PFS 202 is created by active server node 102a as part of the process of mounting filesystem 106. Existence of PFS 202 within active server node 102a indicates that filesystem 106 is mounted, or available within, active server node 102a.

Active server node 102a, standby server node 102b and node 102c each include a respective application process 204a, 204b and 204c. Application processes 204 are intended to be representative clients of filesystem 106. Within SSI cluster 100, application processes 204 access filesystem 106 using a cluster file environment. The cluster file environment, or CFE, includes several components. One of these components is a cluster filesystem (CFS) 206. As shown in FIG. 2, CFS 206 includes a CFS server 208 and a series of CFS clients 210a, 210b and 210c. Active server node 102a creates an instance of CFS server 208 for each mounted filesystem. For the example or FIG. 2, this means that a single instance of CFS server 208 has been created for filesystem 106.

Nodes 102 create instances of CFS client 210 to allow application processes 204 to access filesystem 106. Preferably, this is done in a dynamic fashion, with each node 102 creating an instance of CFS client 210 as filesystem 106 is initially accessed in the node 102. In the example or FIG. 2, this means that clients 210a, 210b and 210c have been created for active server node 102a, standby server node 102b and node 102c, respectively.

CFS 206 is a stackable filesystem and acts as an intermediate layer between application processes 204 and PFS 202. CFS clients 210 provide the same set of vfs and vnode operations provided by PFS 202. Application processes 204 manipulate filesystem 106 and files located in filesystem 106 using the vfs and vnode operations provided by CFS clients 210. CFS clients 210 transmit the operations performed by application processes 204 to CFS server 208. CFS server 208, in turn, invokes PFS 202 to perform the requested operation on filesystem 106.

The cluster file environment (CFE) also includes a cluster mount service 216. Cluster mount service 216 is a deamon process that operates within SSI cluster 100. Cluster mount service 216 maintains information that describes the physical location of each mounted filesystem, such as filesystem 106, within SSI cluster 100. At the time of creation, nodes 102 query cluster mount service 216. Nodes 102 use the information maintained by cluster mount service 216 to build instances of CFS client 210. This allows CFS clients 210 to be logically linked with CFS server 208.

CFE also includes a token manager. In FIG. 2, the token manager component of CFE is shown as server token manager portion 212 and client token manager portions 214a, 214b and 214c. CFS server 208 and CFS clients 210 use server token manager portion 212 and client token manager portions 214 to ensure coherent access to filesystem 106. More specifically, within SSI cluster 100, attributes of filesystems, and attributes of files located within filesystems, have associated tokens. As an example, size and modification time are both files attributes. In SSI cluster 100, these attributes have associated tokens. To access an attribute of filesystem 106 or an attribute of a file included in filesystem 106, a CFS client 210 must acquire the token associated with the attribute from CFS server 208. CFS clients 210 request tokens using client token manager portions 214. Client token manager portions 214, in turn, communicate these requests to server token manager portion 212 and CFS server 208. CFS server 208 examines each request received by server token manager portion 212. CFS server 208 then uses server token manager portion 212 to grant or deny tokens depending on whether the requested tokens may be granted without compromising the coherency of filesystem 106. Server token manager portion 212 then communicates each response of CFS server 208 to the requesting client token manager portion 214 and CFS client 210.

To increase concurrency, SSI cluster 100 provides several different types of tokens. Preferably, these token types include read-only and read-write types. This allows multiple CFS clients 210 to simultaneously read a file or file system attribute but prevents more than a single CFS client 210 from simultaneously modifying file or file system attributes. SSI cluster 100 also preferably includes range token types. Range token types are tokens that refer to a portion of an attribute. This allows multiple CFS clients 210 to simultaneously modify different parts of the same file or file system attribute. For example, by using range token types multiple CFS clients 210 may simultaneously write to different portions of the same file.

CFS OPERATION RECOVERY

An embodiment of the present invention includes a method that allows standby server node 102b to transparently replace active server node 102a as the mount point for filesystem 106. During this failover, application processes 204 experience no loss in data integrity or other attributes associated with filesystem 106. To provide this type of transparent failover, operations performed by the CFS 206 must be guaranteed to complete, even if active server node 102a fails. CFS 206 is able to make this guarantee through the use of a combination of failure detection and failure recovery techniques.

For the purposes of the present invention, failures of active server node 102a are categorized into three scenarios. In the first of these scenarios, a CFS client 210 is performing an operation on behalf of an application process 204. Before CFS client 210 can send the operation to CFS server 208, there is a failure of active server node 102a. In this scenario, the failure of active server node 102a is detected by the transport mechanism that links CFS client 210 and CFS server 208. The transport agent reports the failure to CFS client 210. Notification of the failure informs CFS client 210 that the operation did not reach CFS server 208. Effectively, it is as if the operation had never been attempted. Thus, in these cases, CFS client 210 performs failure recovery by placing the application process 204 performing the operation into an interruptable sleep state. CFS client 210 then waits until failover reestablishes CFS server 208 on standby server node 102b. When failover has completed, CFS client 210 wakes the sleeping application process 204 and retries the identical operation.

The second and third failure scenarios, like the first, involves a CFS client 210 performing an operation on behalf of an application process 204. In these scenarios, CFS client 210 successfully sends the operation to CFS server 208. These two scenarios differ as to when failure occurs. For the second scenario, failure occurs before CFS server 208 has completed the operation. For the third scenario failure occurs after CFS server 208 has completed the operation but before an acknowledgment is sent back to CFS client 210. In either case, failure of active server node 102a is detected by the transport mechanism that links CFS client 210 and CFS server 208. The transport agent reports the failure to CFS client 210. As a result, CFS client 210 is aware of the failure of active server node 102a. CFS client 210 cannot, however, determine whether the operation has completed (third scenario) or not completed (second scenario).

Failure recovery for the second and third scenarios depends on the type of operation being performed at the time of failure. Specifically, failure recovery depends on whether the operation being performed was idempotent or non-idempotent. Idempotent operations are operations that act as if they have been performed once, even if they are called multiple times. For example, the act of setting a variable to a given value is idempotent since it can be repeated without changing effect. Similarly, the act of writing data into a particular location within a file is idempotent. Within filesystems that support the vfs and vnode interfaces, VFS_VGET, VFS_SETCEILING, VFS_STATVFS, VFS_SYNC, VOP_READ, and VOP_GETATTR are all examples of idempotent operations. VFS_ROOT, VFS_MOVE, VFS_MOUNTROOT, VOP_CREATE, VOP_MKDIR, VOP_REMOVE, VOP_RMDIR, VOP_RENAME, VOP_LINK, VOP_SYMLINK, VOP_SETATTR, VOP_SETACL, and VOP_WRITE are all examples of non-idempotent operations.

In cases where an idempotent operation was being performed at the time of failure, failure recovery is similar to failure recovery under the first scenario. Thus, CFS client 210 first places the application process 204 performing the operation into an interruptable sleep state. CFS client 210 then waits until failover reestablishes CFS server 208 on standby server node 102b. When failover has completed, CFS client 210 wakes the sleeping application process 204 and retries the identical operation.

Figure 3:
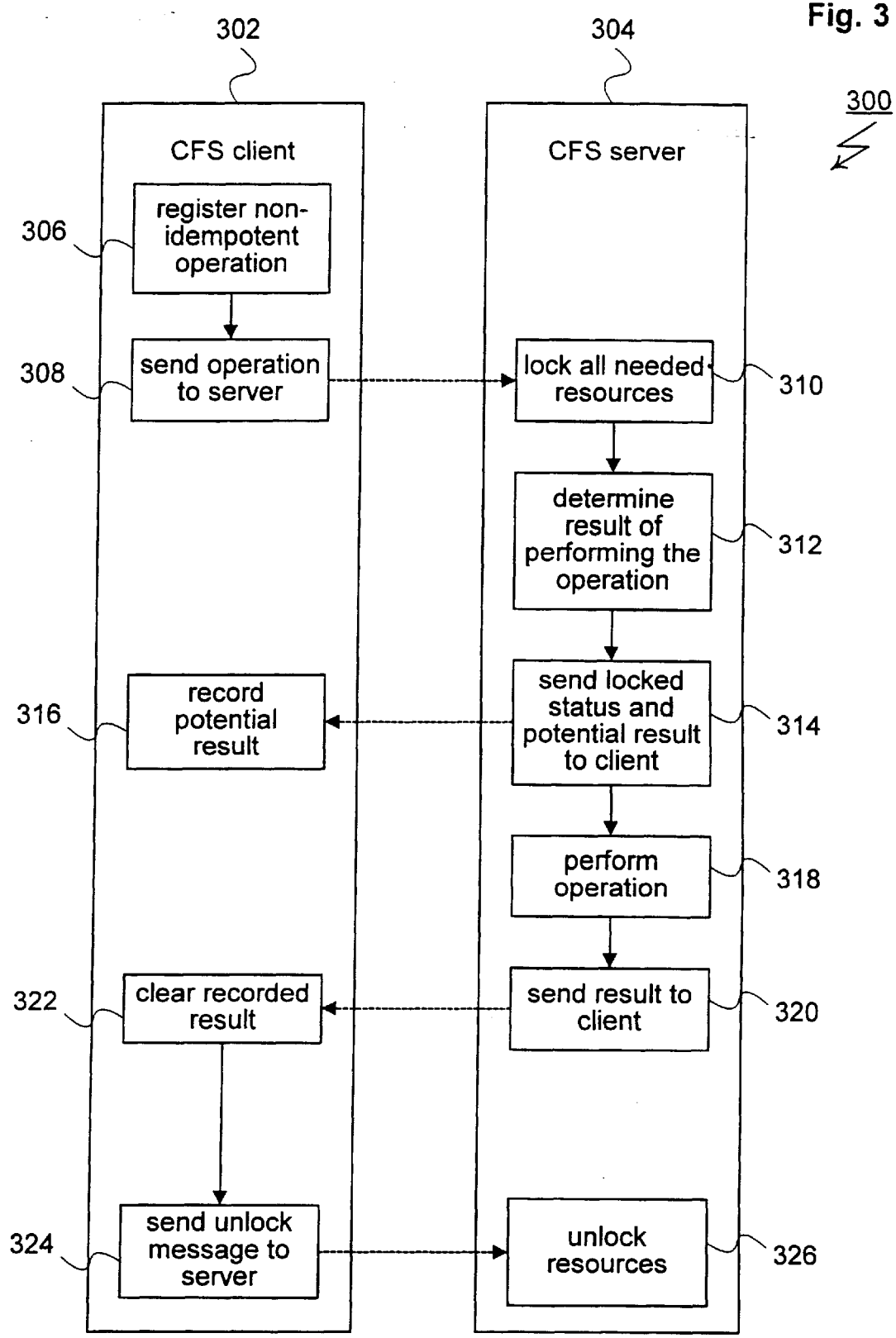
FIG. 3 is a flowchart showing the steps associated with processing non-idempotent operations as used by the cluster file environment (CFE) of an embodiment of the present invention.
Figure 4:
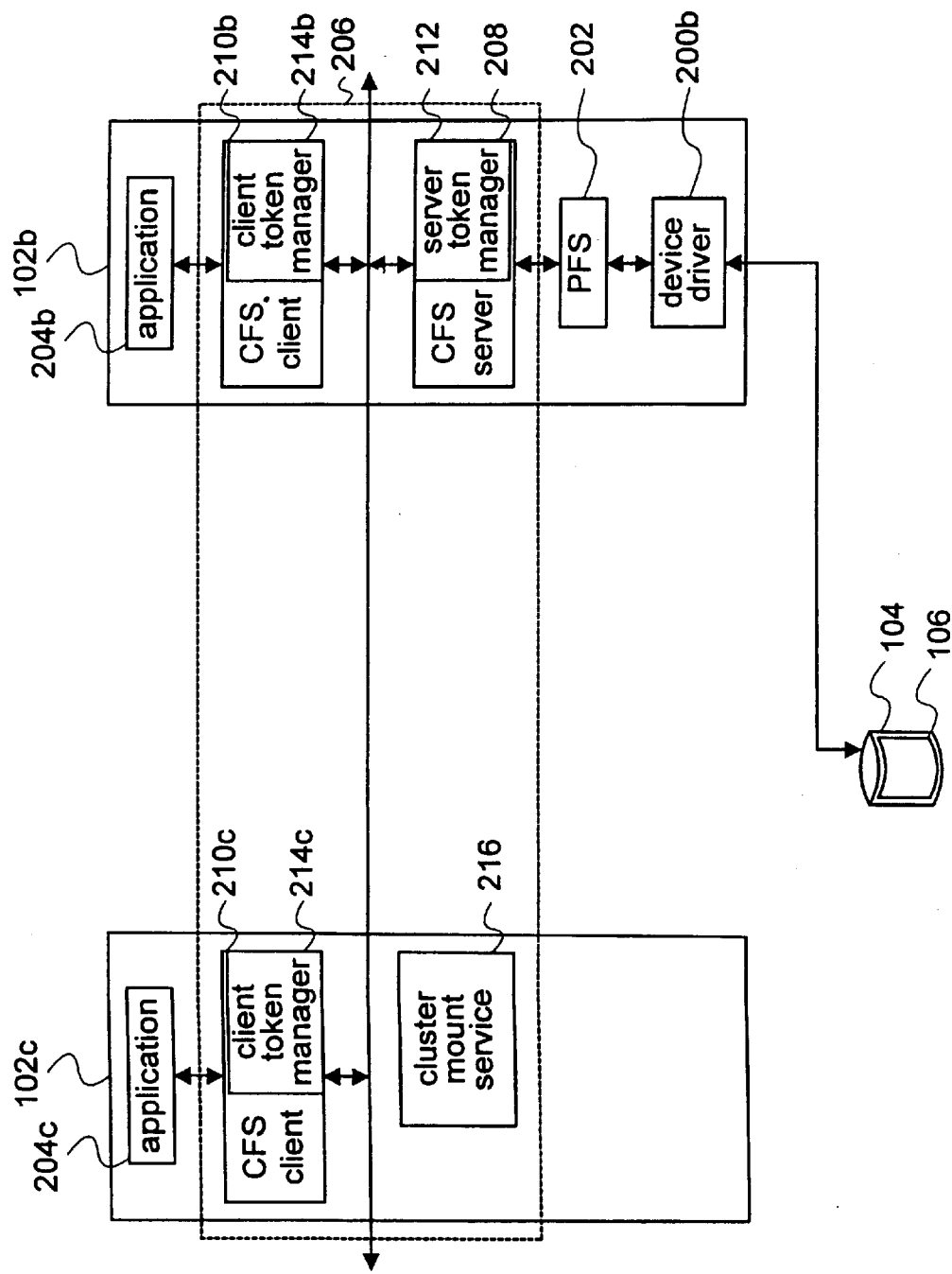
FIG. 4 is a block diagram of the computer cluster of FIG. 1 shown after node failure and subsequent filesystem failover.

Failure recover for non-idempotent operations is more complex. The added complexity requires that CFS clients 210 and CFS server 208 perform additional steps during the processing of non-idempotent operations. These additional steps allow failure recovery to be performed in the event that failure occurs during the processing of these operations. A method for performing non-idempotent operations, as used by an embodiment of the present invention, is shown in FIG. 3 and generally designated 300.

Method 300 includes steps performed by CFS clients 210 and steps performed by CFS server 208. For convenience, these steps are grouped into a client context 302 and a server context 304, respectively. Method 300 begins with step 306 where a CFS client 210 locally registers that it is processing a non-idempotent operation. During this registration, CFS client 210 creates a data structure for the non-idempotent operation being processed. The data structure includes information that describes the non-idempotent operation. The data structure also includes space that will be used (in subsequent steps of method 300) to store information describing the expected result of the non-idempotent operations. Preferably, CFS client 210 stores the created data structure in a queue of ongoing non-idempotent operations. In step 308, CFS client 210 follows registration by sending the operation to CFS server 208.

Receipt of the operation causes CFS server 208, in step 310, to lock all of the files and directories required to perform the requested operation. The locks are typically applied using sleep locks or other multiprocessing locking techniques. By locking, CFS server 208 ensures stability of all objects whose state may alter the repeatability of the requested operation.

After locking the required resources, CFS server 208, in step 312, evaluates the effect of performing the requested operation. In performing this evaluation, CFS server 208 does not actually perform the operation. Instead, in step 312, CFS server 208 determines what results the requested operation would have produced, had the operation been performed at the time of step 312.

In step 314, CFS server 208 sends a message to CFS client 210. The message informs CFS client 210 that CFS server 208 has locked the resources required to perform the requested operation. The message also tells CFS client 210 what the result of performing the requested operation would be (i.e., CFS server 208 transmits the evaluation of the requested operation performed in step 312).

CFS client 210 responds, in step 316, by making a record of the evaluated result of the requested operation. CFS client 210 may make this record in memory, on disk, on in some other storage facility. Even more generally, it is possible for the record to be constructed without the help of CFS client 210. The record must, however, be constructed in a fashion that will survive the failure of active server node 102a. For the described embodiment, CFS client 210 stores the record of the evaluated result in the data structure created by CFS client 210 in step 306.

Execution within the server context 304 continues at step 318 where CFS server 208 performs the requested operation. Within CFS server 208 this is accomplished by calling the appropriate functions within the vfs and vnode interfaces of PFS 202. The results of performing the operation are sent by CFS server 208 to CFS client 210 in step 320.

In step 322 CFS client 210 receives the results sent by CFS server 208. Receipt of the results of the operation allows CFS client 210 to invalidate or delete the record made by CFS client 210 of the evaluated result of the requested operation (see description of step 316). After this record is invalidated or deleted, execution of method 300 continues at step 324 where CFS client 210 sends an unlock message to CFS server 208. In step 326, CFS server 208 receives this message and unlocks the resources that it had previously locked in step 310.

Performing non-idempotent operations in the manner of method 300 allows CFS client 210 to perform failure recovery. The steps performed by CFS client 210 to perform failure recovery depend on when failure is detected. A failure detected before CFS client 210 makes a record of the evaluated result (step 316), means that the requested operation was never performed. In these cases, CFS client 210 first places the application process 204 performing the operation into an interruptable sleep state. CFS client 210 then waits until failover reestablishes CFS server 208 on standby server node 102b. When failover has completed, CFS client 210 wakes the sleeping application process 204 and retries the identical operation.

A failure detected after CFS client 210 makes a record of the evaluated result (step 316) means that the requested operation may, or may not, have been performed by CFS server 208. In these cases, CFS client 210 first places the application process 204 performing the operation into an interruptable sleep state. CFS client 210 then waits until failover reestablishes CFS server 208 on standby server node 102b. When failover has completed, and before any new operations are attempted, CFS client 210 wakes the sleeping application process 204 and retries the identical operation. This retry is part of the failover process and must be performed before any new operations are attempted. Otherwise, conflicting operations could invalidate the operation's result. The result generated during the retry of the operation may differ from the evaluated result recorded in step 316. This is because the operation is non-idempotent and may have been already been performed. For this reason, CFS client 210 returns the evaluated result recorded in step 316, and not the result generated during the retry of the operation.

NON-ROOT FILESYSTEM FAILOVER

Figure 5:
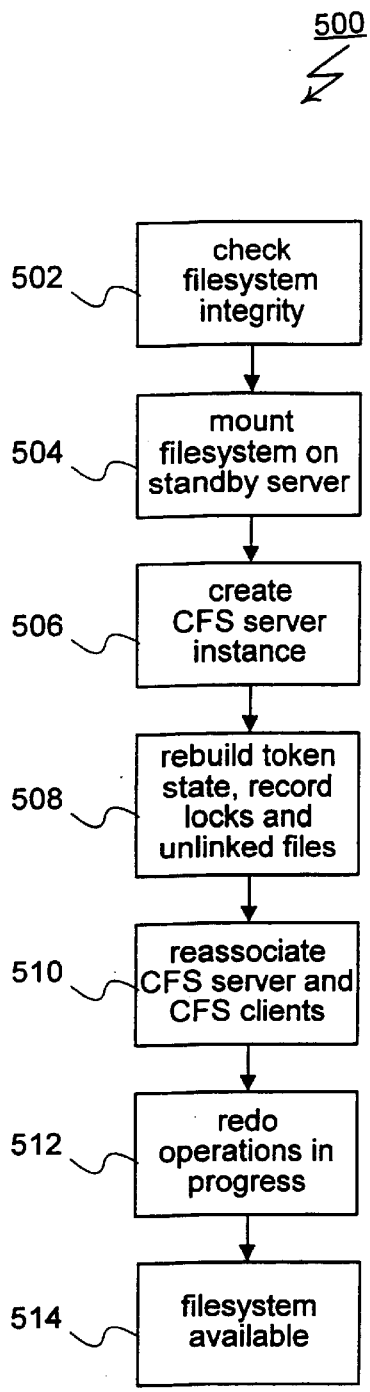
FIG. 5 is a flowchart showing the steps associated with method for failover of non-root filesystems as used by the cluster file environment (CFE) of an embodiment of the present invention.

The failure detection and recovery techniques described in the preceding paragraphs enable the present invention to perform transparent failover of filesystem 106. A method for filesystem failover is shown in FIG. 5 and generally designated 500. Failover method 500 is initiated when SSI cluster 100 detects that active server node 102a has failed. Upon detection of failure, cluster mount service 216 notifies standby server node 102b. In step 502, standby server node 102b responds to this notification by carefully checking the integrity of filesystem 106. This can be accomplished by using the fsck application to detect and correct any inconsistencies present in filesystem 106. Alternately, where filesystem 106 is a journal type file system, standby server node 102b may forward play the journal of filesystem 106 to correct any inconsistencies. Eliminating inconsistencies in filesystem 106 has the important effect of ensuring that all filesystem operations are atomic (i.e., filesystem 106 does not contain any artifacts associated with partially completed operations).

In step 504, standby server node 102b mounts filesystem 106. The mount operation creates a new PFS 202 instance for filesystem 106. After mounting filesystem 106, execution of method 500 continues at step 506 where standby server node 102b creates a new instance of CFS server 208 and stacks the new instance onto the newly created PFS 202.

As previously discussed, CFS server 208 grants tokens associated with the resources included in filesystem 106. During normal operation of SSI cluster 100, an arbitrary number of these tokens may have been granted to CFS clients 210. As a result, an arbitrary number of these tokens may be granted at the time of failure of active server node 102a. In step 508, standby server node 102b rebuilds this pre-failure token state within the newly created CFS server 208. To accomplish this task, standby server node 102b queries the nodes 102 that remain active in SSI cluster 100. Each node 102 responds by sending information to standby server node 102b. This information describes each token held by CFS clients 210 for resources included in filesystem 106. The information also describes, open unlinked files, file record locks held by processes, and partially completed operations. Standby server node 102b uses the information sent by nodes 102 to rebuild the pre-failure token state within the context of the newly created CFS server 208.

In step 508, standby server node 102b also reestablishes the pre-failure condition of file record locks and open-unlinked files within filesystem 106. The specific procedures used by standby server node 102b to perform these tasks are described more fully in later portions of this document.

Execution of method 500 then continues at step 510 where standby server node 102b re-associates the remaining instances of CFS clients 210b and 210c with the new instance of CFS server 208. Following re-association, standby server node 102b (in step 512) replays operations that were interrupted by the failure of active server node 102a. Replay of interrupted operations is more fully described in later portions of this document. After replay, standby server node 102b functions as the active server node for filesystem 106.

For completeness, it should be noted that "mount" in the context of step 504 of method 500 has a slightly different meaning than "mount" in the general UNIX sense. More specifically, during step 504 standby server node 102b locks the mount point associated with filesystem 106. Standby server node 102b then initializes PFS 202 for filesystem 106 without making PFS 202 available to processes within SSI cluster 100. Standby server node 102b completes the mount operation of step 504 by associating the locked mount point with the initialized PFS 202. The remaining steps of method 500 (i.e., steps 504 through 514) are then performed by standby server node 102b. Preferably, this entire sequence of steps (i.e., steps 504 through 514) is performed atomically and, in this way, appears to be a single "mount" operation to processes within SSI cluster 100.

ROOT FILESYSTEM FAILOVER

Figure 6:
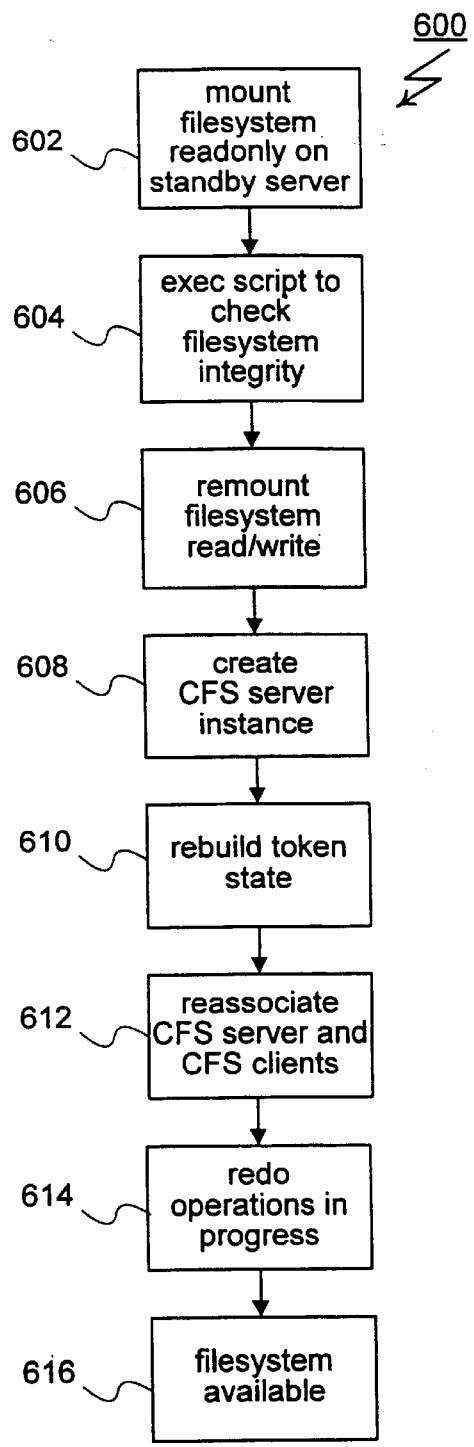
FIG. 6 is a flowchart showing the steps associated with method for failover of a root filesystem as used by the cluster file environment (CFE) of an embodiment of the present invention.

Method 500 allows the SSI cluster 100 to transparently failover non-root filesystems. A method that allows the SSI Cluster 100 to transparently failover its root filesystem is shown in FIG. 6 and generally designated 600. Within the description of method 600, it may be assumed that filesystem 106 is the root filesystem of SSI cluster 100. Failover method 600 is initiated when SSI cluster 100 detects that active server node 102a has failed. In step 602, the UNIX operating system of standby server node 102 responds to this detection by mounting filesystem 106 read-only on standby server node 102b. The mount operation creates a new PFS 202 instance for filesystem 106.

After read-only mounting of filesystem 106, execution of method 600 continues at step 606 where standby server node 102b creates a process to check the integrity of filesystem 106. The created process is given a root directory and current working directory in the physical filesystem 106 created in step 602. The created process then executes a script (or list of commands) to check the integrity of filesystem 106. Commands and files required during the execution of this script may be physically located in filesystem 106 (since filesystem 106 is mounted read-only). Within UNIX and UNIX-like environments, the process of creating a process followed by execution of a script may be accomplished by performing an exec of the file including the script. An important result of the integrity checking operation of step 604 is to remove inconsistencies present in filesystem 106. This has the effect of ensuring that all filesystem operations are atomic (i.e., filesystem 106 does not contain any artifacts associated with partially completed operations).

Standby server node 102b then executes the steps already described with regard to method 500 (i.e., steps 606 through 616 correspond to steps 502 through 514 of method 500) to complete failover of filesystem 106.

HANDLING OF OPEN-UNLINKED FILES DURING FILESYSTEM FAILOVER

Within UNIX® and UNIX-like environments, each file has an associated link count. The link count is typically maintained in the file's inode structure. At any given time, a file's link count indicates the number of directory entries that reference the file. An open files also has an associated reference count. The reference count is maintains in the file's vnode structure. A file that is actively being used has a reference count equal to the number of processes using the file. When a file's link and reference counts reach zero, the file's resources are made available for reuse. In effect, the file is deleted.

An open-unlinked file results when one or more processes maintain a file in an open state after the file has been unlinked from all directories that had links to the file. Thus, open-unlinked files have link counts equal to zero but reference counts that are greater than zero. Processes may continue to use open-unlinked files. After all processes have closed the file, the file's reference count becomes zero and the resources of the file become available for reuse. In most cases, open-unlinked files are created by processes as temporary files. If a process using an open-unlinked file unexpectedly terminates, the open-unlinked file is automatically reclaimed. This provides a simple mechanism for ensuring that temporary files are deleted when they are no longer required.

In traditional UNIX environments, system failures transform open-unlinked files into unlinked files. This follows because processes in traditional UNIX environments do not survive system failures. As a result, processes using open-unlinked files cease to exist, transforming open-unlinked files into unlinked files. Deleting these files is one of the reasons that UNIX systems perform an integrity check on each filesystem before that filesystem is made available for use. During the integrity checking process, inconsistencies in the filesystem are detected and, when possible, corrected. As part of this process, unlinked files are detected and removed. Deletion of unlinked files allows the resources used by the unlinked files to be reused.

The same logic does not apply in the case of SSI cluster 100. This is true because application processes 104 and filesystem 106 do not necessarily reside on the same node 102. As a result, application processes 104 may survive the failure of active server node 102a and subsequent failover of filesystem 106. Using FIG. 1 as an example, it may be assumed that application processes 104a and 104b each have open-unlinked files in filesystem 106. If active server node 102a fails, application process 104a is terminated. Application process 104b, however, survives the failure of active server node 102a. Thus, in this case, filesystem 106 includes one unlinked file and one opened-unlinked file.

Failure of active server node 102a is followed by failover of filesystem 106. As part of failover, standby server node 102b performs an integrity check of filesystem 106 (see step 502 of method 500). During this integrity check, standby server node 106 must avoid removing files that are in the opened-unlinked state. At the same time, standby server node 106 must remove files that are properly classified as unlinked.

Figure 7:
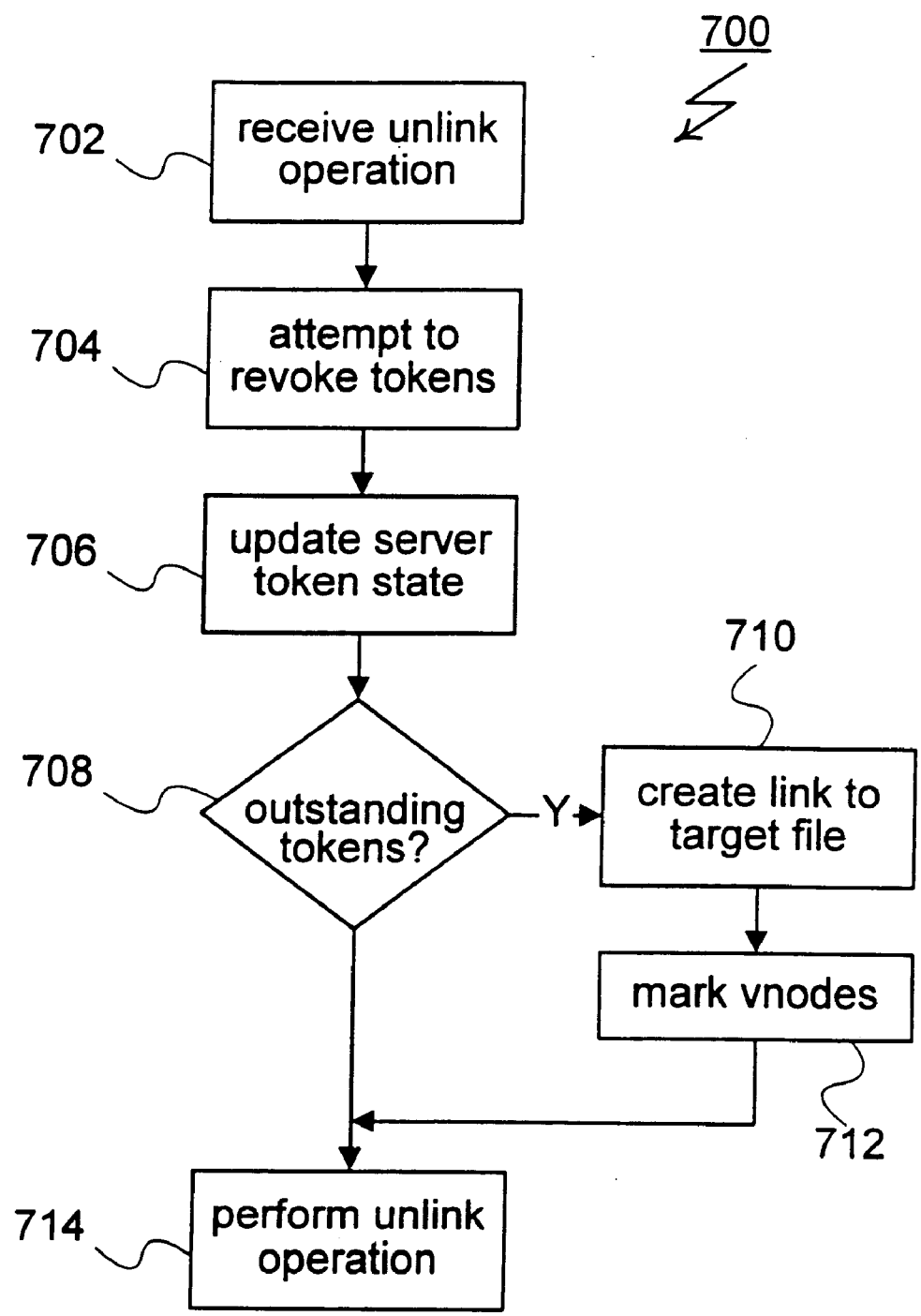
FIG. 7 is a flowchart showing the steps associated with processing unlink operations as used by the cluster file environment (CFE) of an embodiment of the present invention.

An embodiment of the present invention includes a method for performing an unlink operation. The unlink method ensures that opened-unlinked files are preserved during filesystem failover. Details of this method are better appreciated by reference to FIG. 7 where the unlink method is shown and generally designated 700. Method 700 begins with step 702 where CFS server 208 receives a request to unlink a target file in filesystem 106. This request is received from one of CFS clients 210 acting on behalf of one of application processes 104.

In step 704, CFS server 208 responds to the unlink request by attempting to revoke all tokens that have been granted within SSI cluster 100 for the target file. CFS server 208 makes this attempt by formulating and sending a message to CFS clients 210. In response to this message, each CFS client 210 determines if it is holding any tokens associated with the target file that may be returned to CFS server 208. CFS clients 210 then send responsive messages to CFS server 208. Each responsive message tells CFS server 208 which tokens, if any, are being returned by a particular CFS client 210. CFS clients 210 return tokens that they are holding for non-essential purposes, such as caching. Tokens that are held for essential purposes, including those held because a process has the target file in an open state, are not returned.

In step 706, CFS server 208 receives each of the responsive messages sent by each of CFS clients 210. For each responsive message received, CFS server 208 updates its internal record keeping to reflect any tokens returned by CFS clients 210.

In step 708, CFS server 208 determines if any CFS clients 210 currently have the target file in an open state. CFS server 208 makes this determination by examining the tokens associated with the target file. If CFS server 208 does not have all of the tokens associated with the target file, CFS server 208 concludes that the target file is open.

If CFS server 208 determines that any CFS clients 210 have the target file in an open state, execution of method 700 continues at step 710. In step 710, CFS server 208 creates a link to the target file in filesystem 106. Preferably, CFS server 208 makes this link in a reserved directory included in the root of filesystem 106. The link is given a unique name. Preferably, CFS server 208 generates this unique name using the file id of the target file.

In step 712, CFS server 208 sends a delayed unlink message to CFS clients 210. The delayed unlink message informs CFS clients 210 that the target file has been relinked in the reserved directory. In response, each CFS client 210 determines if it is holding the target file in an open state. CFS clients 210 make this determination by ascertaining if they have allocated any vnode structures for the target file. CFS clients 210 then mark each vnode structure that is associated with the target file as being subject to delayed unlinking.

Execution of method 700 completes at step 714. In step 714, CFS server 208 unlinks the target file. CFS server 208 performs the unlink operation by invoking the vnode interface of PFS 202. The unlink removes the original link to the target file. In cases where one or more CFS clients 210 have the target file in an open state, the target file remains linked in the reserved directory.

Figure 8:
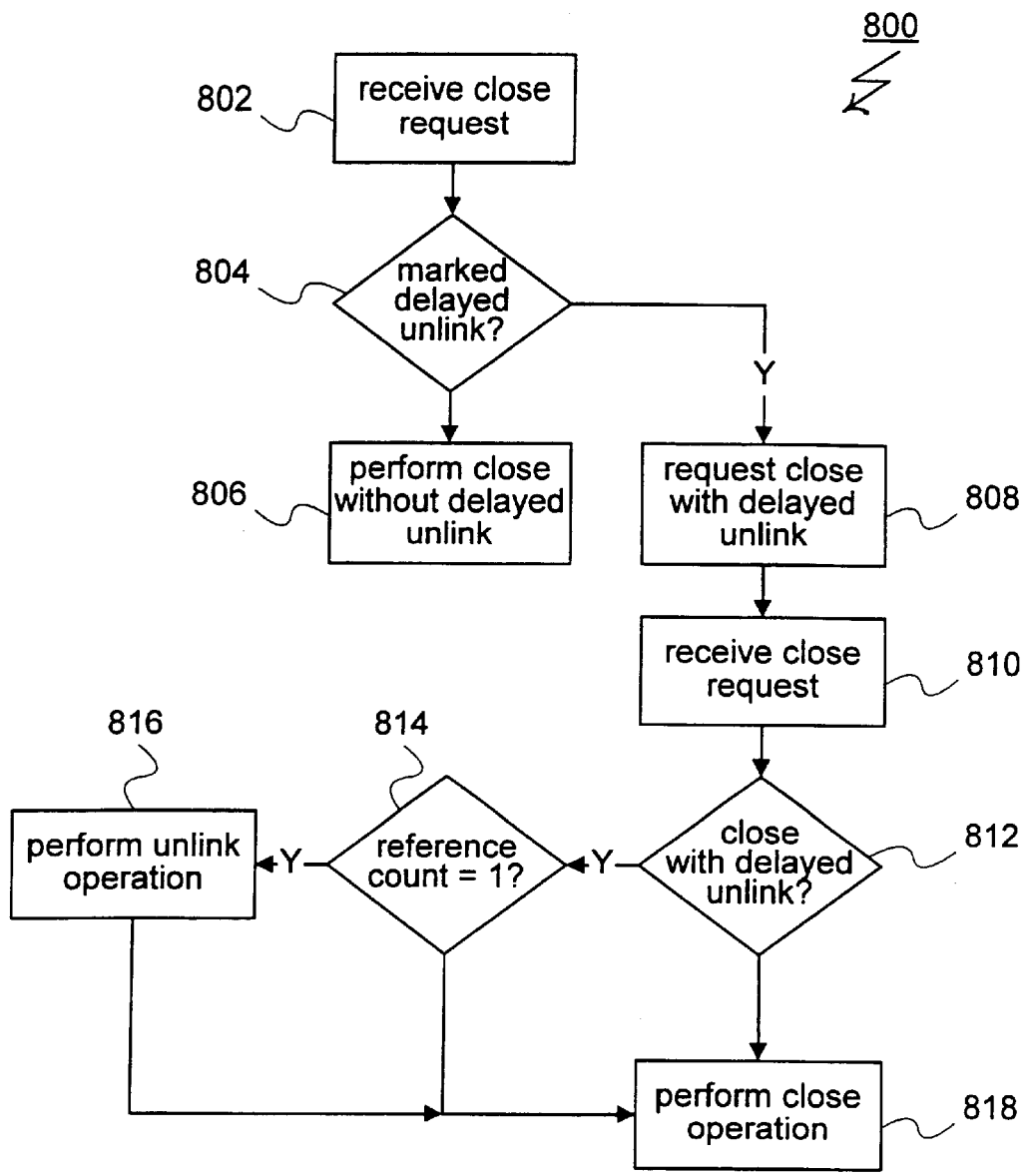
FIG. 8 is a flowchart showing the steps associated with processing close operations as used by the cluster file environment (CFE) of an embodiment of the present invention.

The link created in the reserved directory prevents the target file from being deleted during integrity checking of filesystem 106. In this way, open-unlinked files survive the failover process. To ensure that the link created in the reserved directory is removed when the target file is no longer needed, the present invention also includes a method for performing a close operation. Details of this method are better appreciated by reference to FIG. 8 where the close method is shown and generally designated 800. Method 800 begins with step 802 where a CFS client 210 receives a request to close the target file. This request is received from one of application processes 104.

In step 804, CFS client 210 examines the vnode structure that the requesting application process 104 is using to access the target file. If the vnode is not marked as requiring delayed unlinking, execution of method 800 continues at step 806 where CFS client 210 performs its normal close processing. During this processing, CFS client 210 may optionally retain tokens for the file being closed. Retaining tokens allows CFS client 210 to reopen the same file without re-acquiring these tokens from CFS server 208. This allows CFS client 210 to more quickly process a subsequent open of the same file.

The alternative to step 806 is step 808 and is reached when CFS client 210 determines (in step 804) that the vnode is marked as requiring delayed unlinking. In step 808, CFS client 210 sends the close request to CFS server 208. The request sent in step 808 includes a return of all tokens for the file.

In step 810, CFS server 208 receives the close request from CFS client 210. In step 812, CFS server examines the received request to determine if delayed linking is required. In the positive case, execution of method 800 continues at step 814. In step 814, CFS server 208 determines if the requested close operation will leave the target file in an unopened state. To be unopened, the target file must have been closed by all of the application processes 104 that had previously held the target file in an open state. Thus, the target file becomes unopened as the last application process 104 having the target file in an open state invokes method 800. Preferably, CFS server 208 makes this determination by examining the outstanding tokens associated with the target file. If the server token structure indicates that the close operation will leave the file with no remaining opens, method 800 continues at step 816 where CFS server 208 unlinks the target file from the reserved directory. CFS server 208 performs the unlink operation by invoking the vnode interface of PFS 202.

Execution of method 800 completes at step 818. In step 818, CFS server 208 closes the target file. CFS server 208 performs the close operation by invoking the vnode interface of PFS 202. If the close operation causes the link count included in the inode associated with the target file to become zero, the resources associated with the file are reclaimed.

HANDLING OF FILE RECORD LOCKS DURING FILESYSTEM FAILOVER

UNIX® and UNIX-like environments allow processes to apply locks to files and to ranges within files. In the context of SSI cluster 100, file locks must be implemented in a fashion that allows them to survive the failover of filesystem 106. Within SSI cluster 100, this is achieved by maintaining redundant copies of file locks within CFS server 208 and CFS clients 210.

As previously described, standby server node 102b creates a new instance of CFS server 208 as part of failover processing (see the preceding descriptions of Methods 500 and 600). To rebuild the file locks managed by the old instance of the CFS server 208, each CFS client 210 (except the CFS client included in the failed node 102) sends its redundant file locks to the newly created CFS server 208. CFS server 208 then reconstructs the file locks using the redundant file locks sent by CFS clients 210. File locks that were held by the CFS client 210 included in the failed node 102 are not rebuilt. This is desirable because application processes 104 using those file locks do not survive the failure of the failed node 102. In this way, SSI cluster 100 ensures that file locks survive failover processing.

An application process 104 acquires a file lock by invoking its local CFS client 210. In response, the local CFS client 210 sends a request message to CFS server 208. CFS server 208 then determines if the requested file lock can be granted (i.e., it does not conflict with other file locks). CFS server 208 then sends a response messages to CFS client 210 indicating whether the requested lock have been granted.

FILE SYSTEM DATA INTEGRITY

In general, it should be appreciated that the preceding methods are most effective in an environment that preserves data integrity during failover processing. SSI cluster 100 may be configured to provide this type of data integrity using a number of different techniques. One of these techniques configures active server node 102 to synchronously transfer operations to disk 104 (synchronous write-through). Synchronous write-through of operations is an effective, if somewhat performance-limited, method for ensuring data integrity during failover processing. A more advanced method for providing data integrity during failover processing is described in a copending U.S. patent application Ser. No. 09/070,897 entitled "Filesystem Data Integrity in a Single System Image Environment," naming Walker et al., as inventors, the disclosure of which is incorporated herein by reference.

CONCLUSION

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for transparent failover of a root filesystem made unavailable by the failure of an active server node on which the root filesystem is mounted within a computer cluster having a number of other nodes, the method comprising the steps of:

placing all application processes currently performing any operations requiring access to the root filesystem in an interruptable sleep state;

mounting the root filesystem within a standby server node in the computer cluster;

creating a server instance associated with the root filesystem and re-associating the server instance with each of the other nodes in the computer cluster;

awakening the application processes placed in an interruptable sleep state and making the root filesystem available on a read-only basis to each of these application processes;

checking the integrity of the root filesystem;

completing the application processes interrupted by the failure of the active server node; and making the root filesystem available within the computer cluster on a read-write basis to new application processes.

2. A method as recited in claim 1 further comprising the step of configuring the server instance to reflect the state of the root filesystem prior to failure of the active server.

3. A method as recited in claim 1 wherein the step of configuring the server instance further comprises the steps of:

rebuilding token state within the server instance;

rebuilding record locks within the server instance; and rebuilding the state of open-unlinked files within the server instance.

4. A method as recited in claim 1 further comprising the step of re-associating the server instance with client instances within the computer cluster.

5. A method for providing filesystem failover in single system image computer cluster environment having a shared file system mounted to an active server node and a number of alternate nodes which share the file system, with at least one node performing a non-idempotent operation on the filesystem, and where the failover occurs before the non-idempotent operation is complete, the method comprising:

registering the non-idempotent operation currently being performed on the filesystem;

locking all resources needed to perform the operation;

determining an estimated result of the operation and storing the estimated result;

detecting the failover before the operation is complete;

placing the operation in an interruptable sleep state;

mounting the filesystem within a standby server node in the computer cluster;

creating a server instance associated with the filesystem and re-associating the server instance with each of the other nodes in the computer cluster;

awakening the operation placed in an interruptable sleep state and completing the operation interrupted by the failure of the active server node; and checking an actual result of the operation with the estimated result in order to determine the integrity of the filesystem.

6. The method of claim 5, further comprising the steps of:

updating the filesystem; and making the filesystem available within the computer cluster on a read-write basis.

* * * * *